UNITED STATES PATENT OFFICE.

FERRUCCIO DONATI AND FRANCESCO HORNBOSTEL, OF FLORENCE, ITALY.

LUBRICATING COMPOUND.

SPECIFICATION forming part of Letters Patent No. 650,037, dated May 22, 1900.

Application filed November 10, 1898. Serial No. 696,063. (No specimens.)

*To all whom it may concern:*

Be it known that we, FERRUCCIO DONATI and FRANCESCO HORNBOSTEL, subjects of the King of Italy, and residents of Florence, Italy, have invented certain new and useful Improvements in Lubricants, of which the following is a full, clear, and exact specification.

Our invention is an improved composition of matter intended for use as a lubricant.

This lubricant consists of—

First. Liquefied leaf-lard or other grease of analogous composition in one thousand parts weight.

Second. Strongly-colored ceresin—that is, yellow ceresin—in variable and proportionate quantity to the degree of consistency which is intended for the lubricator, about fifty parts. The yellow ceresin is used instead of the white ceresin to impart color to the mixture, so as not to be obliged to use too large a quantity of martius yellow for reasons of economy.

Third. The necessary quantity of carbonate of sodium or soda salts to bring about only a certain compactness of the lubricant and not a true and complete saponification. As the saponification is not complete, the acidity is not completely neutralized by the addition of the carbonate of sodium, which is employed in a quantity of about one hundred parts.

Fourth. The alkaline salt of the dinitro-alpha-naphthol, known commonly as the "martius yellow." (See page 60 of *Organic Coloring Matters*, by Schultz and Julius, London, 1894, MacMillan & Co.) This is a sodium calcium or ammonium salt of dinitronaphthol, the quantity employed being about five to ten parts.

Fifth. A very intimate mixture of very fine and chemically-pure plumbago made impalpable by careful sifting and of very fine steatite in proportions which vary according to the use intended, (in accordance with the stronger or weaker friction of the parts to lubricate,) the quantity employed being about one to two parts. The mixture is effected in hot condition after purification of the grease and the carbonate of sodium (soda salt) from water which they might contain and by a mechanical process consisting in kneading or mixing the ingredients by means of a kneader or mixer made up of wings or blades. All substances are placed into the kneader or mixer at a temperature of 120° centigrade, and they are allowed to cool gradually and slowly. The mixture must come out very uniformly and homogeneously and in a characteristic maroon color.

The function of the sodium, calcium, or ammonium salt of the dinitro-alpha-naphthol (martius yellow) is as follows: It has proved itself a very useful element in the preservation of the lubricating mixture by maintaining its lubricant properties. Practice has proved that a lubricant with admixture of this substance is subject to less wear than a mixture without it.

We claim as our invention—

The composition of matter here described consisting of a greasy body, ceresin, carbonate of sodium, martius yellow, plumbago and steatite in substantially the proportions specified.

In witness whereof we have hereunto set our hands in presence of two witnesses.

FERRUCCIO DONATI.
FRANCESCO HORNBOSTEL.

Witnesses:
GWANNS BATTISTA BANION,
ANGEOLO CAPPELLETZ.